United States Patent [19]

Godbersen

[11] Patent Number: 4,900,051
[45] Date of Patent: Feb. 13, 1990

[54] BOAT TRAILER FRAME ASSEMBLY

[76] Inventor: Byron L. Godbersen, Lake LaJune Estates, Ida Grove, Iowa 51445

[21] Appl. No.: 287,165

[22] Filed: Dec. 21, 1988

[51] Int. Cl.$^4$ .............................................. B60P 3/10
[52] U.S. Cl. .................................. 280/414.1; 414/534
[58] Field of Search ..................... 280/414.1; 414/529, 414/530, 531, 532, 533, 534, 535, 536

[56] References Cited

U.S. PATENT DOCUMENTS

| | | | |
|---|---|---|---|
| 3,917,087 | 11/1975 | Godbersen | 280/414.1 |
| 4,232,879 | 11/1980 | Boxrod | 280/414.1 |
| 4,278,388 | 7/1981 | Johnson | 280/414.1 |
| 4,329,108 | 5/1982 | Godbersen | 280/414.1 |
| 4,448,438 | 5/1984 | DeWalk | 280/414.1 |
| 4,781,515 | 11/1988 | Johnson | 414/534 |

Primary Examiner—Charles A. Marmor
Assistant Examiner—Donn McGiehan
Attorney, Agent, or Firm—Henderson & Sturm

[57] ABSTRACT

A trailer for hauling a boat having a wheel and axle supported frame including a pair of frame members extended rearwardly from a tongue connection in a laterally spaced relationship, a cross member assembly supported on upper surfaces of the frame members, and bunk-type units mounted on the cross member assembly for engageable with a portion of the hull of the boat, the cross member assembly having a non-load bearing pivotal connection with the frame members while supported thereon.

6 Claims, 3 Drawing Sheets

BOAT TRAILER FRAME ASSEMBLY

TECHNICAL FIELD

The present invention relates generally to boat carrying trailers, and more particularly to those of the type in which a longitudinal frame having a tongue and hitch for attachment to a prime mover is equipped with support units including the frame engaging the keel and the bottom of the boat hull adjacent the bow and stern, respectively, the frame having a pair of ground wheels adjacent the rear of the frame. To load and unload the boat to and from the trailer, the trailer is moved into the water a sufficient distance to enable the boat to float on and off the trailer, as controlled by a winch assembly adjacent the hitch.

BACKGROUND ART

With an ever increasing number of different sized and shaped boats, the contemporary trailers have tended to develop an ever increasing arrangement of bow, keel and stern supports for accommodating the great variety of trailers. Proper distribution of the weight of the trailer on the frame such that pressure on the tongue will accommodate a balanced connection to the prime mover has been attempted by having one or more stationary hull and keel support units mounted forwardly on the frame, and either bunks or gangs of horizontally and vertically adjustable rollers mounted rearwardly on the frame. Examples of various such arrangements are shown in U.S. Pat. Nos. 2,816,672; 2,948,423; 3,774,790 and 3,917,087.

Nevertheless, the trailer industry has not only not solved the constant problem of ease of adjustment for proper tongue weight distribution, but has exacerbated the problem by proliferation of the types and arrangement of gangs of rollers mounted on, for example, a rear cross member adjacent the trailer axle for the wheels, and wherein the rear cross member is attached between members of the frame in a manner causing torquing of the frame inwardly and toward the center thereof. Such torquing not only shortens the life of the frame, but detracts from the efficacy of the support of the boat hull by the roller gangs or bunks mounted on the cross member.

It is to the elimination of this problem of frame torquing and its attendant disadvantages that this invention is directed.

DISCLOSURE OF THE INVENTION

In a trailer for transporting a boat or the like, the trailer having a longitudinal frame of wishbone shape, the forward tongue end having a hitch for connection to a prime mover, having a stand-mounted winch assembly for cable control of the boat, a wheel and axle unit mounted rearwardly of the frame, a hull and keel supporting assembly secured to the frame forwardly of the wheels, and a frame cross member assembly comprising a cross member and end brackets pivotally mounted on upper surfaces of the frame, and with a pair of in-line roller units mounted thereon in laterally-spaced, parallel, longitudinally extended arrangement for supporting a portion of the hull of the boat.

It is an object of this invention to provide a new and novel boat trailer of the type described herein.

It is another object of this invention to provide a boat trailer frame assembly for improved, positive support of the hull of a boat carried by the trailer, and wherein a tendency of the outer frame members to torque or rotate inwardly toward the longitudinal axis of the frame is thereby obviated.

It is still another object of this invention to provide an improved frame assembly for a boat trailer for reducing the tendency of outer frame members to torque or rotate inwardly while simultaneously providing a longitudinal positioning connection of a cross member assembly with the outer frame members.

Yet another object of this invention is to provide a cross member unit for supporting at least a portion of a hull of a boat, the cross member unit extending between outer members of the frame of the trailer, and further wherein outer end portions of the cross member unit rest on the frame of the trailer in a manner to impose a load bearing of a vertical nature as compared to previous types of boat trailer cross member units which are mounted in relation to the sides of a frame in a disadvantageous manner such as to cause twisting of the outer frame members about an axis longitudinal of the frame.

BRIEF DESCRIPTION OF THE DRAWINGS

These and other attributes of the invention will become more clear upon a thorough study of the following description of the best mode for carrying out the invention, particularly when reviewed in conjunction with the accompanying drawings, wherein.

BEST MODE FOR CARRYING OUT THE INVENTION

Figure 1:
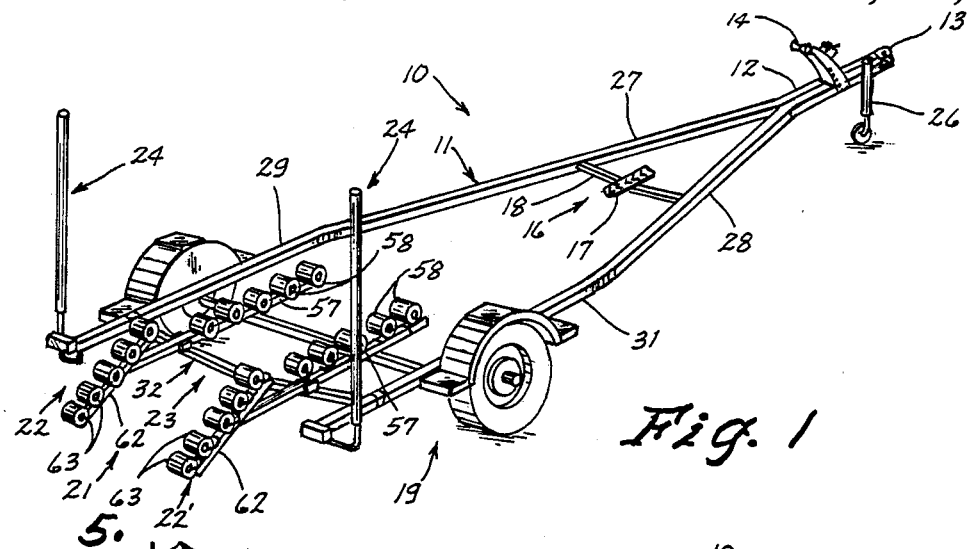
FIG. 1 is a perspective view of the boat trailer of the present invention.
Figure 2:
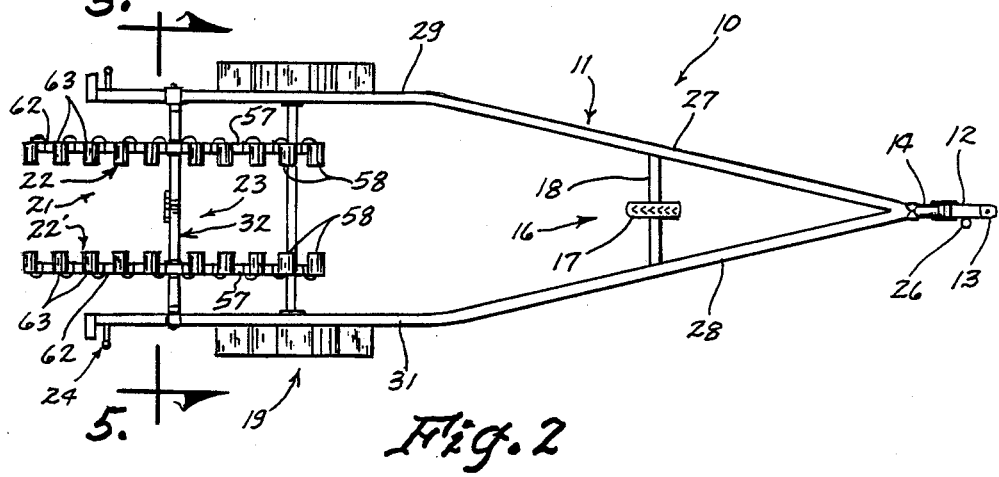
FIG. 2 is a top plan view thereof.
Figure 3:
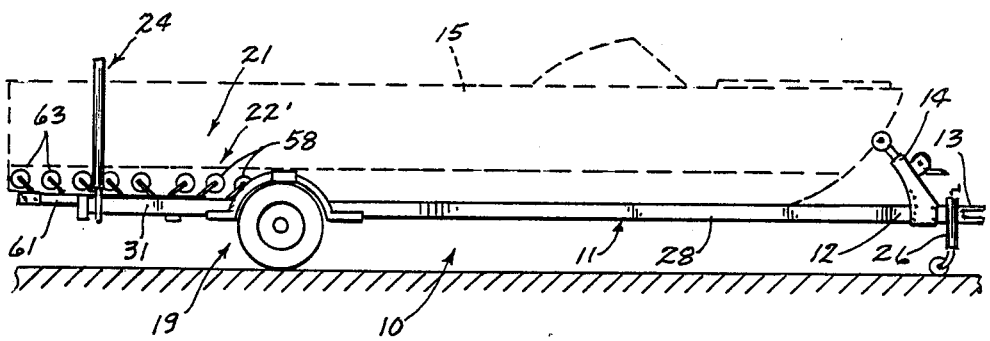
FIG. 3 is side elevational view thereof, a boat being carried by the trailer being shown by dotted lines.

Referring now to the drawings, the boat trailer of this invention is illustrated generally at (10) in FIGS. 1-3 and comprises a frame assembly (11) including a tongue (12) and hitch (13) for conventional attachment to a prime mover (not shown); a winch and stand assembly (14) mounted on the tongue (12) for mounting and demounting connection to the boat (15) (FIG. 3) to be transported thereby; a hull and keel supporting assembly (16) which includes a pivotal keel supporting unit (17) and a front hull supporting unit (18); a wheel and axle unit (19) for rollably supporting the rear of the frame assembly (11); a rear hull supporting unit (21) including a pair of in-line roller units (22) and (22') mounted on a cross member assembly (23); and a post load guide unit (24). A conventional jack unit (26) is provided the front of the tongue (12) for supporting the trailer (10) in a horizontal position while not connected to a prime mover.

The frame assembly (11) includes a pair of diverging side members (27, 28) with integral, parallel rear members (29, 31), the latter mounted on the wheel and axle unit (19). The diverging side members (27, 28) are interconnected by the front hull supporting unit (18) of the hull and keel supporting assembly (16), and the parallel frame side members (29), (31) are interconnected by the cross member assembly (23).

Figure 4:
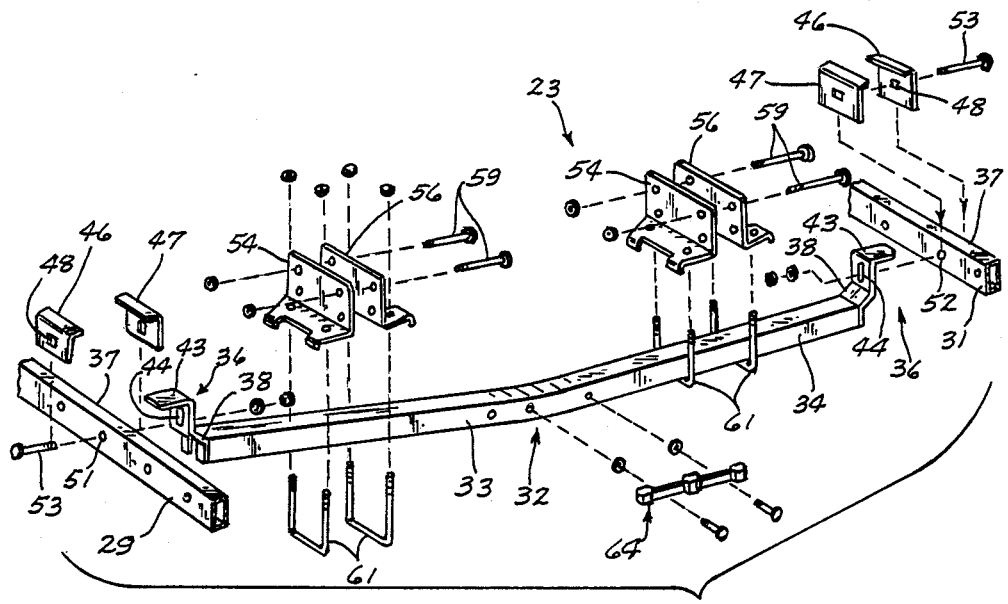
FIG. 4 is a perspective, exploded view of the cross member assembly of the boat trailer of this invention.
Figure 5:
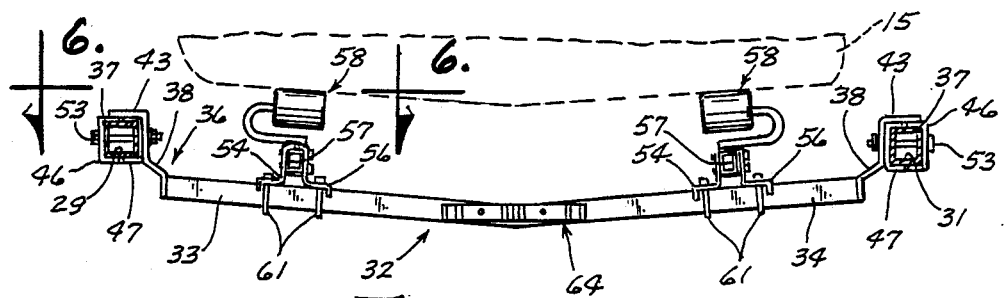
FIG. 5 is an elevational view taken along the lines 5—5 in FIG. 2 of the cross member assembly of this invention.
Figure 6:
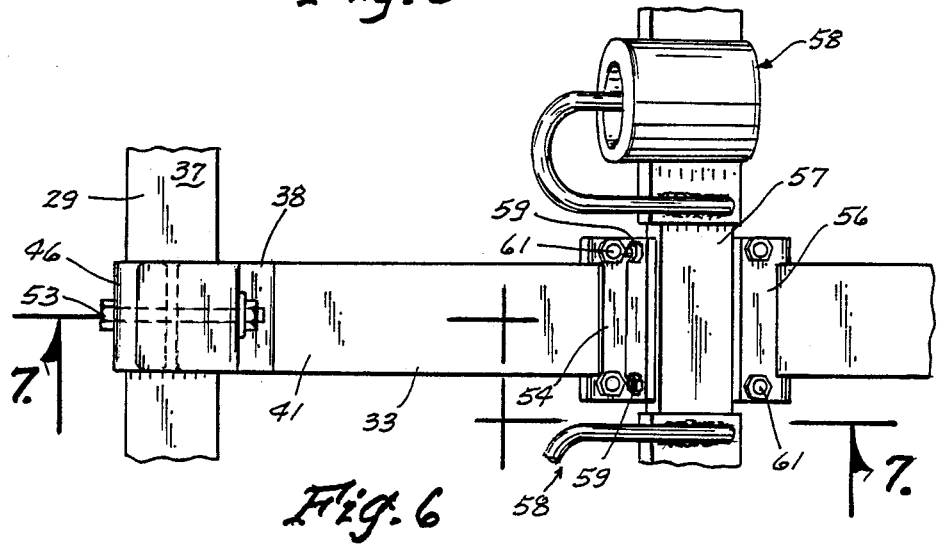
FIG. 6 is an enlarged, fragmentary plan view as taken along the line 6—6 in FIG. 5.

More particularly, the cross member assembly (23) of the rear hull supporting unit comprises an elongated, tubular cross member (32) having a pair of integral downwardly converging sections (33), (34) (FIGS. 4, 5), and an end unit (36) secured to the outer end of each section (33), (34). Each end unit (36) is supported on the upper surface (37) (FIG. 4) of a contiguous rear frame member (29), (31).

Each end unit (36) includes an L-shaped bracket (38) having a lower portion (39) affixed to the outer end (41) (FIG. 7) of a cross member section (33) (FIG. 7), or (34) (FIG. 4); and includes further a generally upstanding middle portion (42), and a laterally, outwardly extending portion (43), disposed normally in a horizontal plane (FIG. 7) for resting upon the contiguous frame member upper surface (37). Each middle portion (42) has an oversize opening (44) (FIG. 7) formed therein for a purpose described hereinafter.

Figure 7:
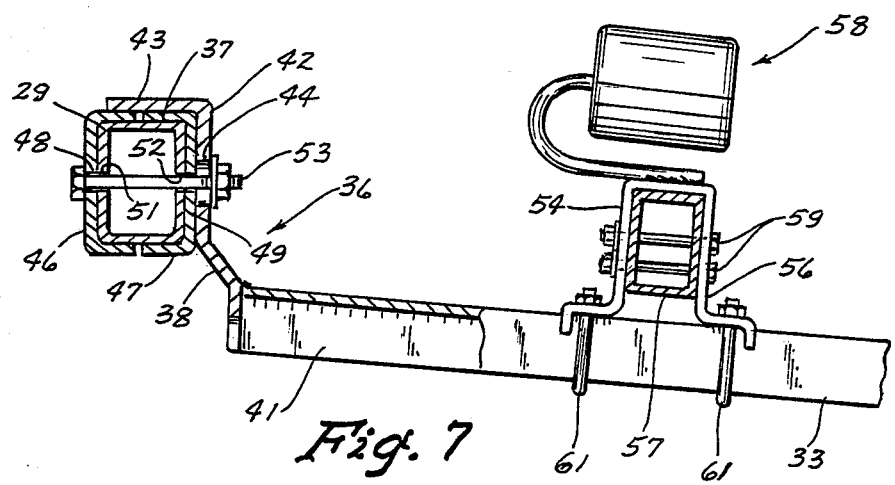
FIG. 7 is a sectional view taken along the lines 7—7 in FIG. 6.

Each end unit (36) includes further a pair of U-shaped pad members (46), (47), each of a size to embrace a respective side of one of the rear frame member (29), (31) (FIG. 7). Further, each pair of pad members (46), (47) have aligned openings (48), (49) formed therein, aligned also with aligned openings (51), (52) formed in the sides of each rear frame member (29), (31), and aligned further with the bracket middle portion opening (44). To connect each bracket (38) to an adjacent frame member (29), (31), a bolt fastener unit (53) is inserted through the aligned openings (44), (48), (49), (51), (52) for positioning the bracket (38).

It will be noted that each frame member (29), (31) has a plurality of longitudinally spaced, aligned pairs of openings (51), (52) (see FIG. 4), whereby the cross member assembly (23) can be optionally located relative to the frame assembly (11) for the most optional support of the particular boat being transported by the trailer (10). With the oversized opening (44), the cross member assembly (23) is permitted a certain amount of pivotal action relative to the rear frame members (29), (31). The pivotal connection is non-load bearing and permits the L-shaped bracket 36 of the cross member to rockably engage the upper surface of the frame members.

Each of the aligned roller units (22), the units being identical, includes a pair of L-shaped brackets (54), (56) adapted to embrace opposed sides of an elongated forward tubular element (57) having a plurality of roller units (58) (FIG. 7) secured thereon in longitudinally spaced, aligned relationship (FIGS. 1 and 2). Fastening devices (59) secure the brackets (54), (56) to the opposed sides of the element (57) for holding the element (57) in a stationary manner, and U-shaped fasteners (61) secure the brackets (54), (56) to a respective cross member section (33) and (34) below.

At the rear end of each of the pair of aligned tubular elements (57), another elongated tubular element (62) is pivotally mounted, each element (62) also carrying a plurality of roller units (63) for adjustable engagement with the hull of the boat carried thereby. An auxiliary tail light unit (64) (FIGS. 4 and 5) may be fastened onto the rear of the cross member sections (33), (34) at their converging center.

Accordingly, it can be seen that the illustrated embodiment of the present invention accomplishes all of the objectives referred to hereinbefore. Obviously, many modifications and variations of the present invention are possible in light of the above teachings. It is therefore to be understood that, within the scope of the appended claims, the invention may be practiced otherwise than as specifically described.

I claim:

1. In a trailer for hauling a boat and having a wheel and axle supported frame including a pair of diverging frame members extended rearwardly from a tongue connection, the frame members each having an upper surface, a frame assembly for supporting a hull portion of a boat, the frame assembly comprising:
    cross member means supported on and rockably engageable with the upper surface of said frame members and extended transversely between said frame members; and
    means mounted on said cross member means in transversely spaced relation thereon and on both sides of the longitudinal axis of the frame for engageably supporting the boat hull portion.

2. A boat trailer frame assembly as defined in claim 1, and further wherein said cross member means is supported only on said frame members upper surface.

3. A boat trailer frame assembly as defined in claim 1, and further wherein said cross member means comprises an elongated tubular member having outer ends a portion of which at each outer end extends over said frame members upper surface so as to rest thereon.

4. A boat trailer frame assembly as defined in claim 3, and wherein each portion comprises a bracket secured to each of said outer ends, each bracket including a first leg extended over said upper surface of each frame member so as to rest thereon, each of said frame members being adjacent to one each of said outer ends.

5. A boat trailer frame assembly as defined in claim 4, and comprising further means connecting each said bracket to each said frame member for positioning said cross members at a predetermined location.

6. A boat trailer frame assembly as defined in claim 5, and further wherein said bracket includes a second leg having an opening formed therein, said connecting means extended through said second leg opening and into each adjacent frame member, whereby said cross member means is pivotal relative to said frame members while being supported thereon.

* * * * *